United States Patent [19]

Edwards

[11] Patent Number: 4,685,688
[45] Date of Patent: Aug. 11, 1987

[54] COMBINED CHILD SAFETY CAR SEAT AND STROLLER

[76] Inventor: Gregory S. Edwards, 8621 Edgewood, Detroit, Mich. 48213

[21] Appl. No.: 701,746

[22] Filed: Feb. 14, 1985

[51] Int. Cl.[4] ............................................. B60F 5/00
[52] U.S. Cl. ..................................... 280/30; 280/643; 280/644; 280/658; 297/184
[58] Field of Search ............ 280/30, 43, 24, 289 WC, 280/639, 642, 643, 644, 647, 648, 650, 658, 43.1; 297/130, 184, 250, 254, 467, DIG. 4

[56] References Cited

U.S. PATENT DOCUMENTS

| | | | |
|---|---|---|---|
| 2,624,395 | 1/1953 | Johnson | 297/487 |
| 2,790,484 | 4/1957 | Pollack | 297/130 |
| 3,361,439 | 1/1968 | Olson | 280/43.1 |
| 3,709,558 | 1/1973 | Jakob | 297/250 |
| 3,944,241 | 3/1976 | Epelbaum | 280/30 |
| 4,215,900 | 8/1980 | Coult | 297/254 |
| 4,256,325 | 3/1981 | Fleischer | 280/650 |
| 4,456,302 | 1/1984 | Knoedler et al. | 297/250 |
| 4,463,984 | 8/1984 | Molnar | 297/250 |

Primary Examiner—John J. Love
Assistant Examiner—Richard Camby
Attorney, Agent, or Firm—Cullen, Sloman, Cantor, Grauer, Scott & Rutherford

[57] ABSTRACT

A combination seat for use as a stroller and a safety car seat for children. The combination seat has telescoping legs with wheels and pivotable telescoping handles which may be extended to function as a stroller or retracted and pivoted to became a child safety car seat. The seat is a one piece molded impact resistant plastic shell to which the telescoping legs and pivotable telescoping handles are attached. The seat has seat belt receptacles for securing the seat in an automobile when used as a child safety car seat. A combined armrest or canopy is disclosed for use either as a stroller or as child safety car seat. The canopy/armrest is comprised of material wrapped about spindle which functions as a armrest. The material may be unwound from the spindle and attached on one end to the seat to function as a canopy. The canopy/armrest may also be moved to a non-interfering position for placing a baby and removing a baby from the combination seat.

7 Claims, 4 Drawing Figures

COMBINED CHILD SAFETY CAR SEAT AND STROLLER

BACKGROUND OF THE INVENTION

1. Field of the invention

This invention relates generally to a combined stroller and child safety car seat, and more particularly concerns a stroller having telescoping legs and a foldable handle which may be converted into a car seat.

2. Description of the Prior Art

Babies and young children have long been transported in strollers and recently have been protected while riding in automobiles by safety car seats. Strollers are especially useful for transporting babies while shopping or taking walks when it would be inconvenient or uncomfortable to carry a baby. Strollers are frequently large bulky apparatus but in recent years have been developed to be foldable into various configuration for storage. When folded such strollers are normally not useful for any particular purpose.

In recent years, child safety car seats have been required by law for babies and small children when riding in an automobile. Such seats are designed to withstand impacts such as when an automobile is involved in an accident.

When a baby is taken by car to a destination it is frequently desirable to then place the baby in a stroller for further transportation. To do so, the baby must be lifted from the car seat and placed in the stroller. If the baby has fallen asleep in the car seat, movement from the car seat into the stroller frequently may result in awakening the baby. Similarly, if the baby has fallen asleep in the stroller and it comes time to place the baby in its car seat the baby will be disturbed.

A need to carry both a car seat and a stroller on such excursions is burdensome and may be difficult in small cars.

It is therefore an object of the present invention to provide a full feature stroller which may be converted into a car seat easily and conveniently.

SUMMARY OF THE INVENTION

A combined car seat and stroller is provided for children which comprises a seat formed of a crush resistant material having means for receiving an automobile seat belt. The seat has handles which may either extend above the seat for use as a stroller or be retracted for use as a car seat. A plurality of legs having wheels are attached to the seat and are extended below the seat to form a stroller or are retracted to a position wherein the wheels provided on the legs do not extend below the seat bottom. The legs are preferably telescopically moveable between the extended and retracted positions.

The seat is preferably a convex shell sized to comfortably receive a small child and has a receptacle for receiving a seat belt formed on opposite lateral sides thereof.

In one embodiment of the invention an adjustable arm rest is provided which may be converted into a canopy. The armrest/canopy may be used whether the seat is used as a stroller or as a car seat. The armrest/canopy comprises a spindle extending between supports extending in front of the car seat upon which a length of flexible sheet material may be rolled for use as an armrest or unrolled and attached to the top of the seat for use as a canopy.

Handles of the combined seat preferably telescope and are interlockable with the retracted wheels when folded in the desired configuration for use as a car seat.

The legs have wheels at the bottom end and telescopically move between a retracted position and an extended position and are lockable in their position by means of a spring loaded button.

Other objects and advantages of the invention will become apparent upon reading the following detailed description and upon reference to the drawings.

DESCRIPTION OF THE ILLUSTRATED EMBODIMENTS

Figure 1:
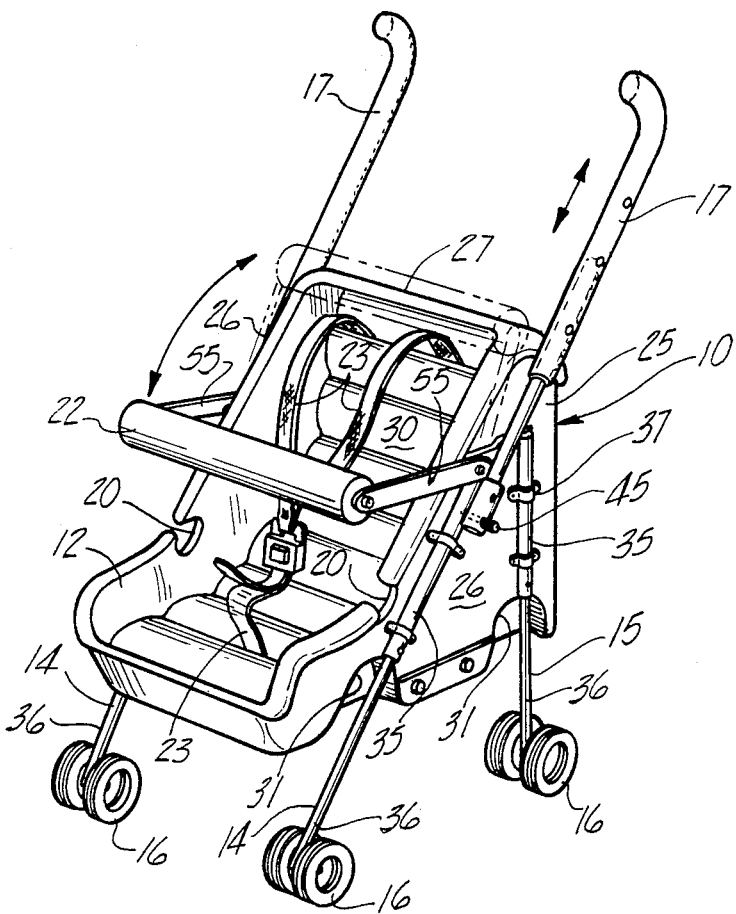
FIG. 1 is a perspective view of the combined seat and its stroller configuration.

A combined car seat and stroller 10 will be described with reference to FIGS. 1 through 4. The combined car seat and stroller comprise a seat 12 to which front and rear legs 14 and 15 are attached. Wheels 16 are secured to the lower end of the front and rear legs 14 and 15 to permit use of the combined car seat and stroller 10 as a stroller. Handles 17 are provided for conveniently pushing the combined car seat and stroller 10 when in its stroller configuration. Seat belt receptacles 20 which perform the function of receiving an automobile seat belt when the combined car seat and stroller 10 is in its car seat configuration and placed in an automobile.

An arm rest 22 is preferably attached to the seat 12 and is intended for use in either the car seat or stroller configuration. Likewise, safety straps 23 are secured to the seat 12 in a conventional manner to comply with regulations relating to safety car seats and to provide an extra measure of safety for a child when the combined car seat and stroller 10 is used as a stroller.

The seat 12 comprises a shell 25 which is preferably made in one piece by an injection molding process. The shell 25 should be of a high strength plastic which is crush resistant and substantially rigid. The rigidity of the seat 12 is necessary in the safety car seat configuration and also acts as a self supporting integral frame for the combined car seat and stroller when used as a stroller thereby eliminating the need for extensive crossbracing and frame members.

The shell 25 is dimensioned to accommodate a small child comfortably and features opposite lateral sides 26 which extend from the top portion 27 to the base 28. As will be readily appreciated, the child is placed in the seat 12 between the lateral sides 26 with its head near the top portion 27. The base 28 in the illustrated embodiment is substantially flat and adapted to be placed upon an automobile seat. The shell 25 is preferably lined by a pad 30 for the comfort of a baby when placed in the seat 12.

Wheel wells 31 are preferably provided in the lateral sides 26 of the shell 25 which extend above the base 28. The wheel wells 31 are preferably deep enough to permit the wheels 16 to be retracted until they are substantially flush with the base 28.

Braces 33 may be provided on the lateral sides 26 of the shell 25 or on other portions as deemed necessary to supplement the rigidity of the shell 25.

The front and rear legs 14 and 15 include support tubes 35 which are attached to the shell 25. The support tubes 35 are adapted to receive the extension tubes 36 to which the wheels 16 are attached. The extension tubes 36 may be locked in position relative to the support tubes 35 by means of a spring loaded button 38. Brackets 42 are preferably provided to clamp or anchor the support tubes 35 to the outside of the shell 25. The support tubes 35 and extension tubes 36 are preferably made of a tubular rigid material such as steel, aluminum or hard plastic.

Figure 2:
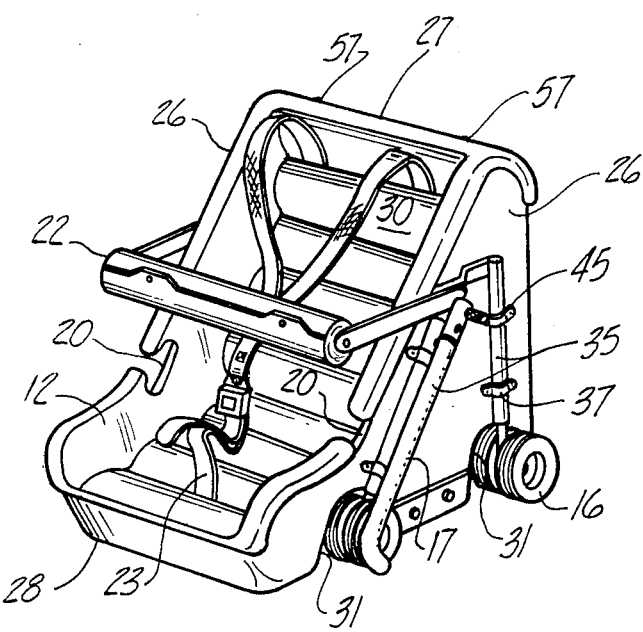
FIG. 2 is a perspective view of the combined seat in its car seat configuration.

The handles 17 are provided on opposite lateral sides 26 of the shell 25 and comprise handle support tubes 44 onto which handle extensions 46 are received. The handle extensions are curved or otherwise adapted to be grasped by the person pushing the combined car seat and stroller 10 when in its stroller configuration. The handle support 44 is preferably secured to the upper end of the support tubes 35 by means of a pivot pin 47 which permits the handles to be rotated between an upright position wherein the handles are positioned for use as a stroller, as shown in FIG. 1, and a second position wherein the handles 17 are interlocked with the front wheels 16 when the wheels 16 are retracted into the wheel wells 31 in the car seat configuration, as shown in FIG. 2. The handle supports 44 are locked against pivoting by locking pin 45 which extends through openings in the handle support 44 and the support tubes 35, when in the upright position. The handle extensions 46 are locked in position relative to the handle support 44 by means of a spring loaded button 48. A series of openings 49 may be provided in the handle support 44 to permit the height of the handle extension 46 to be adjusted for the comfort of the person pushing the stroller.

Figure 3:
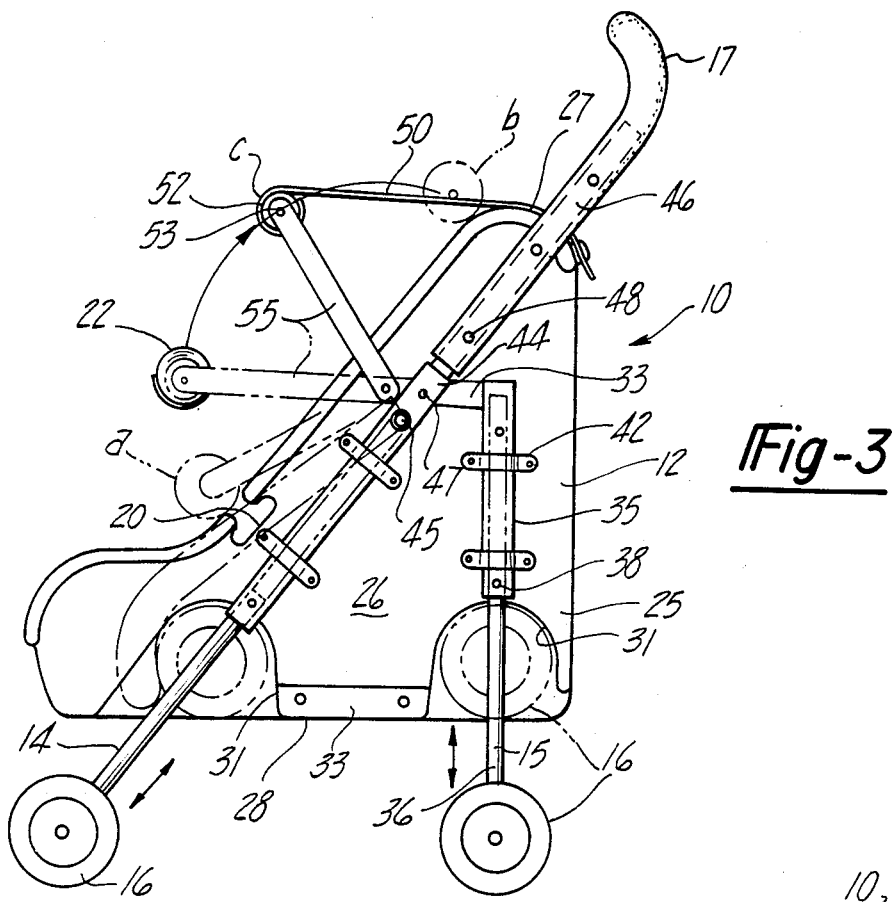
FIG. 3 is a side view of the combined seat in the stroller configuration with the armrest/canopy in the canopy mode and showing the other positions of the armrest/canopy in phantom.
Figure 4:
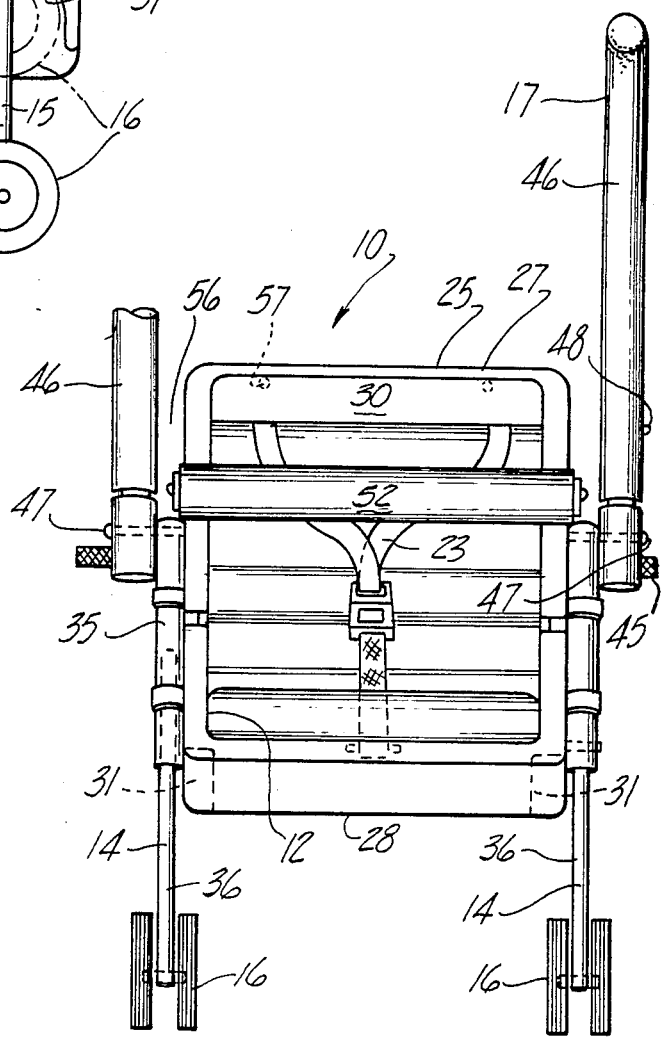
FIG. 4 is a front view of the combination seat in its stroller configuration.

In one embodiment, best shown in FIG. 3, a canopy 50 may be provided for providing shade for a baby in the seat 12. The canopy 50 is useful in either the car seat or stroller configuration. The canopy 50 is convertible to the arm rest 22. The canopy 50 comprises a roll of material 52 on a spindle 53 which extends between support arms 55 that are attached to opposite lateral sides 26 of the shell 25. The support arms 55 are attached to the lateral sides 26 of the shell 25 by means of pivot pins 56. Snap fasteners 57 are preferably provided on the top portion 27 of the seat 12 and on the end of the roll of material 52.

The armrest 22/canopy 50 may perform its multiple functions by positioning the support arms 55 in different positions relative to the seat 12. In one position, indicated by the letter "A" in FIG. 3, it functions as an armrest 22. In position "A" the support arms 55 hold the roll of material 52 on the spindle 53 across the lap of a small child seated in the combined car seat and stroller 10. The armrest 22/canopy 50 may be moved out of the way by pivoting the support arms 55 to another position adjacent the top portion 27 of the seat 12, as indicated by the letter "B" in FIG. 3. When it is desirable to use the armrest 22/canopy 50 as a canopy 50 the support arms 55 may be pivoted to a third position, indicated by the letter "C" in FIG. 3, located between the positions "A" and "B". The material 52 may then be unrolled from the spindle 53 and secured on one end to the top portion 27 of the seat 12 by means of the snap fasteners 57. In this way the canopy 50 can be used to provide shade for a small child in the seat 12 regardless of whether the combined car seat and stroller 10 is in its car seat or stroller configuration.

The support arms 55 are attached to the shell 25 and are spaced inwardly from the handles 17 to permit handles to rotate between the car seat and stroller configuration without interference from the support arms 55.

Operation of the combined car seat and stroller 10 will be described with reference to FIGS. 1 and 2 wherein the procedure is set forth for converting the combined car seat and stroller 10 from the stroller configuration shown in FIG. 1 to the car seat configuration shown in FIG. 2. It should be understood that the conversion steps may be changed in order without changing the invention. The front and rear legs 14 and 15 are first telescoped, or retracted by sliding the extension tubes 36 into the support tubes 35. The handles 17 are then pivoted about the pivot pins 47 from the position shown in FIG. 1 to the position shown in FIG. 2 wherein the handle 17 substantially overlay the front legs 14. Handle extension 46 may then be telescoped into the handle support 44. The curved portion of the handle 17 may then interlock with the wheels 16 of the front legs 14. Spring loaded buttons 38 of the front and rear legs 14 and 15 are used to hold the extension tubes 36 and the support tubes 35 as shown in FIG. 2. The spring loaded buttons 48 of the handle 17 are likewise used to lock the handle extension 46 in position in the handle support 44 as shown in FIG. 2.

The armrest 22 may be pivoted to the upright position "B" shown in FIG. 1 if the child is to be placed in the seat 12.

It should be noted that operation of the armrest 22 is completely independent of operation of the handles 17 and that the armrest 22/canopy 50 may be in either the armrest position "A", upright position "B", or canopy position "C" when converted. If a child is in the combined car seat and stroller 10 when it is necessary to convert the stroller to a car seat, or visa versa, it may be done without disturbig the child since it is not necessary to invert or otherwise change the condition of the seat 12. This is an important advantage of the present invention since a sleeping baby may remain undisturbed as the combined car seat and stroller is changed in its configuration.

The operation of the armrest 22/canopy 50 will be described with reference to FIG. 3. The armrest 22/canopy 50 when in position "A", functions as an armrest. To permit a baby to be placed in the seat 12 the armrest 22/canopy 50 is pivoted about the pivot pins 56 to position "B" where it is adjacent the top portion of the seat 12 and out of the way. To convert the armrest 22 into the canopy 50 the armrest 22/canopy 50 is moved to position "C" and the flexible sheet material 52 is unrolled from the spindle 53 and snapped to the top portion 27 of the seat 12 by means of the snaps 57. The support arms 55 may be placed in a range of positions either closer to or further from the top portion 27 of the seat 12 depending upon the length of the material 52 and the amount of shading required for the baby.

Many changes and modifications in the illustrated embodiment of the invention can of course be made without departing from the scope of the invention. Accordingly, the scope of the invention is intended to be limited only by the scope of the appended claims.

What is claimed is:

1. A combined safety car seat and stroller apparatus for chilren comprising:

a convex shell dimensioned to accommodate a small child and being formed in one piece of substantially rigid and crush resistant moled plastic;

receptacle means for receiving an automobile safety belt included on said apparatus;

base means for supporting said apparatus on a vehicle seat;

said shell having first and second lateral sides, each of said sides having front leg and rear leg support tubes rigidly attached to said shell above said base means and diverging from each other on their lower ends;

a plurality of legs each being telescopically received in said leg support tubes and being shiftable from a retracted position wherein said legs are substantially entirely received within said leg support tubes and an extended position in which said legs have an upper end secured within the lower end of said leg support tubes and a lower end extending below said base means, said legs extending from said front and rear support tubes respectively in divergent directions;

a plurality of wheels each being secured to the lower ends of said legs and being shiftable with said legs from the retracted position wherein said wheels are disposed above said base means to the extended position wherein said wheels are disposed below said base means at the divergently spaced locations whereby a broad wheel base is provided for said apparatus when used as a stroller;

first and second handle support tubes pivotally attached to first and second lateral sides of said shell respectively; and, first and second handles telescopically attached to said first and second handle support tubes respectively, said handles being shiftable from a first position wherein said handle extends above said shell and a second position wherein the entire length of said handles are laterally adjacent said shell.

2. The combined safety car seat and stroller of claim 1, wherein said means for receiving an automobile safety seat belt comprises first and second receptacles attached to opposite lateral sides of the seat, said receptacle being provided for partially enclosing the automobile safety seat belt when said seat is used as a safety car seat.

3. The safety car seat and stroller of claim 1, wherein an adjustable harness is attached to said seat for restraining a small child when placed in said seat.

4. The combined safety car seat and stroller of claim 1, wherein said legs may be locked in the first and second position alternatively by spring loaded buttons.

5. The combined safety car seat and stroller of claim 1, wherein wheel wells are molded in the opposite lateral sides of the seat and are adapted to receive the wheels when the legs are telescoped into their second position wherein said wheels do not extend below said seat.

6. A combined safety car seat and stroller for children comprising:

a seat formed of a resilient, substantially rigid and crush resistant material;

means for receiving an automobile safety seat belt included on said seat;

two handles attached to opposite lateral sides of said seat and having a first position wherein said handles extend above said seat and a second position wherein said handles are laterally adjacent said seat, said handles being pivoted relative to the seat when folded into its second position;

a plurality of legs attached to said seat, said legs being telescopically movable between a first position wherein said legs extend below said seat and a second position wherein said legs are laterally adjacent said seat, said legs each having a wheel attached to an end of each leg opposite the seat in the first position; and, wherein said handles interlock with the wheels when said handles are placed in their second position and the legs are placed in their second position whereby the combined safety car seat and stroller may be used as a car seat.

7. The combined safety car seat and stroller of claim 6 wherein said handles telescope to various height positions, and said handles are pivoted lengthwise relative to the seat when folded into its second position.

* * * * *